United States Patent [19]

Hood

[11] 4,211,114
[45] Jul. 8, 1980

[54] INDICATING THERMOMETER

[76] Inventor: Stanley R. Hood, 11568 Sorrento Valley Rd., Suite 10, San Diego, Calif. 92121

[21] Appl. No.: 957,690

[22] Filed: Nov. 6, 1978

[51] Int. Cl.² ............................................. G01K 5/64
[52] U.S. Cl. .................................................. 73/363.9
[58] Field of Search ........................ 73/363.9; 116/286

[56] References Cited

U.S. PATENT DOCUMENTS

| | | | |
|---|---|---|---|
| 2,679,758 | 6/1954 | Lamb et al. | 73/363.9 |
| 3,122,018 | 2/1964 | Freeman et al. | 73/363.9 |
| 3,507,154 | 4/1970 | Schonberger | 73/363.9 |
| 3,842,675 | 10/1974 | Hunt | 73/363.9 |
| 4,044,708 | 8/1977 | Klein | 116/286 X |
| 4,100,804 | 7/1978 | Gorgerat | 73/363.9 |
| 4,137,771 | 2/1979 | Young et al. | 73/363.9 |

FOREIGN PATENT DOCUMENTS 561287 5/1944 United Kingdom .................... 73/363.9

Primary Examiner—Donald Watkins
Attorney, Agent, or Firm—Wallenstein, Spangenberg, Hattis & Strampel

[57] ABSTRACT

An indicating thermometer comprises a molded single piece main member including a disc-like portion and a hollow stem portion having an end wall, and a temperature responsive assembly including a shaft, a plug and a bimetallic helical coil having its ends secured to the shaft and the plug which is secured in the main member, wherein the shaft is journalled for sliding and rotation in the end wall of the stem portion of the main member and in the plug which is secured in the disc-like portion of the main member. An indicator member is secured to the shaft and a cover member is secured to the main member for enclosing the indicator member.

13 Claims, 5 Drawing Figures

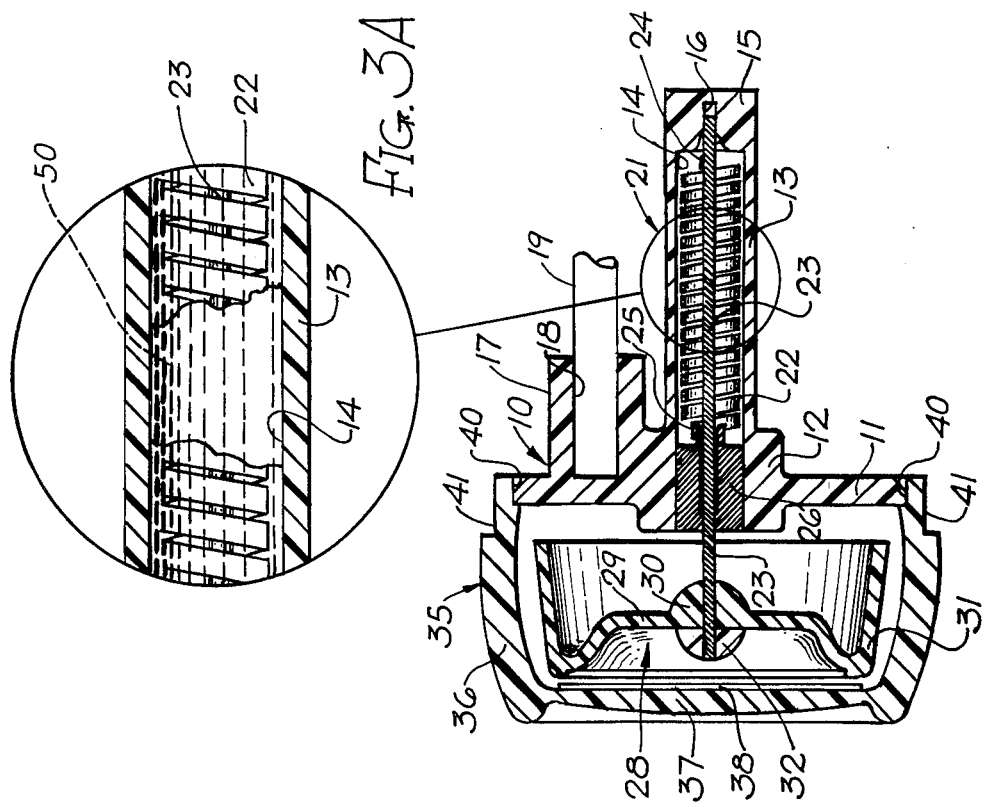
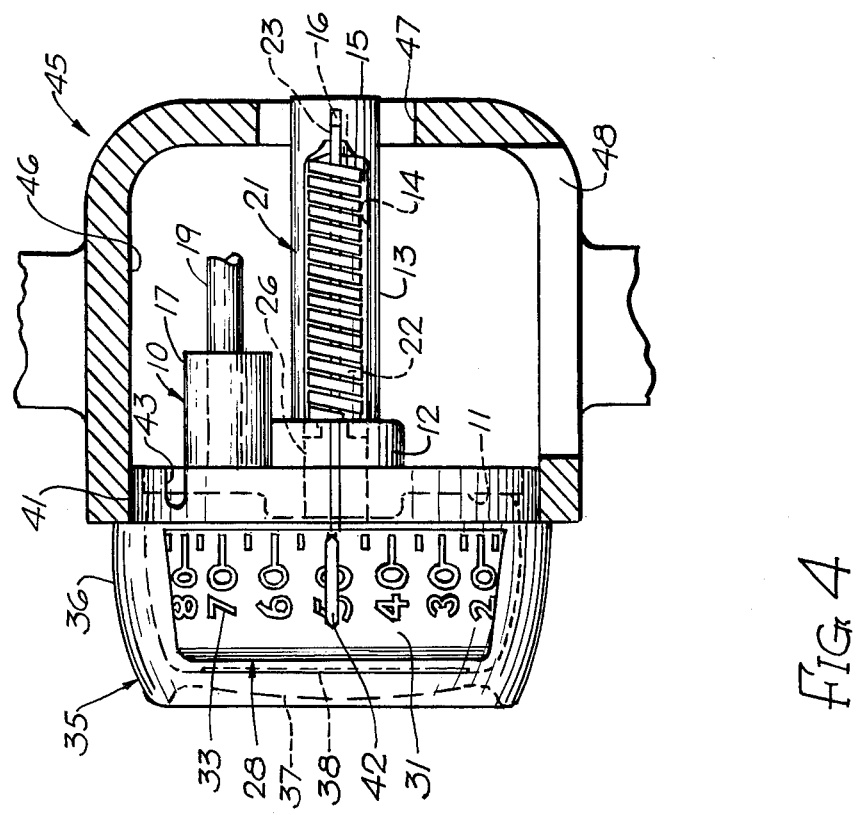

INDICATING THERMOMETER

This invention has to do with indicating thermometers for visually indicating temperature conditions, such as, for example, outside or ambient temperature conditions in the automotive industry or the like, and constitutes a decided improvement over the thermometer disclosed in U.S. Pat. No. 3,842,675 of George D. Hunt, granted Oct. 22, 1974.

The principal object of this invention is to provide an improved indicating thermometer which is relatively inexpensive to manufacture, assemble and calibrate, particularly with respect to the aforementioned patent, and which is simple in construction, utilizes a minimum of parts, is readily assembled and calibrated, is rugged in construction and is foolproof in operation.

Briefly, in accordance with this invention, the indicating thermometer has a single piece main member including an annular disc-like portion having an enlargement at the center thereof, a stem-like portion extending from the enlargement axially of the disc-like portion, a cylindrical opening extending through the enlargement and partially through the stem-like portion to provide the stem-like portion with a relatively thin tubular wall and an end wall, and a hole extending centrally from the opening partially through the end wall to provide a bearing in the end wall of the stem-like portion.

The indicating thermometer also has a temperature responsive assembly including a shaft, a plug having a central hole therethrough slidably and rotatably receiving the shaft to provide a bearing therefor, and a bimetallic helical coil secured at one end to the shaft adjacent one end thereof and secured at its other end to the plug. This assembly is inserted and located as a unit within the opening in the single piece main member with the bimetallic helical coil adjacent the tubular wall of the stem-like portion, with said one end of the shaft journalled for sliding and rotation in the bearing in the end wall of the stem-like portion, with the plug secured in the opening in the enlargement of the disc-like portion, with the shaft journalled for sliding and rotation in the bearing of the plug, and with the other end of the shaft extending beyond the plug.

The indicating thermometer further has an indicator member secured to said other and extending end of the shaft adjacent the annular disc-like portion of the main member to be rotated by the shaft in accordance with temperature conditions affecting the bimetallic helical coil. A single piece annular cover member is secured to the annular disc-like portion of the single piece main member for enclosing the indicator member.

The indicating thermometer may be secured in a bracket of a door mounted rear view mirror of an automobile or the like for indicating outdoor or ambient temperatures. In this respect, the bracket may have passages therethrough for directing air over the stem portion of the indicating thermometer so as to respond accurately to the outside or ambient temperature. The temperature indication is readily observable from the interior of the automobile.

Other objects of this invention reside in the details of construction of the indicating thermometer and in the cooperative relationships between the component parts thereof.

Further objects and advantages of this invention will become apparent to those skilled in the art upon reference to the accompanying specification, claims and drawings in which:

FIG. 3 is a vertical sectional view through the indicating thermometer taken substantially along the like 3—3 of FIG. 1.

FIG. 3A is an enlarged sectional view of a portion of the indicating thermometer illustrated in FIG. 3.

FIG. 4 is a diagrammatic illustration of the indicating thermometer of this invention mounted in a mounting bracket for a door mounted rear view mirror of an automotive vehicle.

Figures 1, 2:
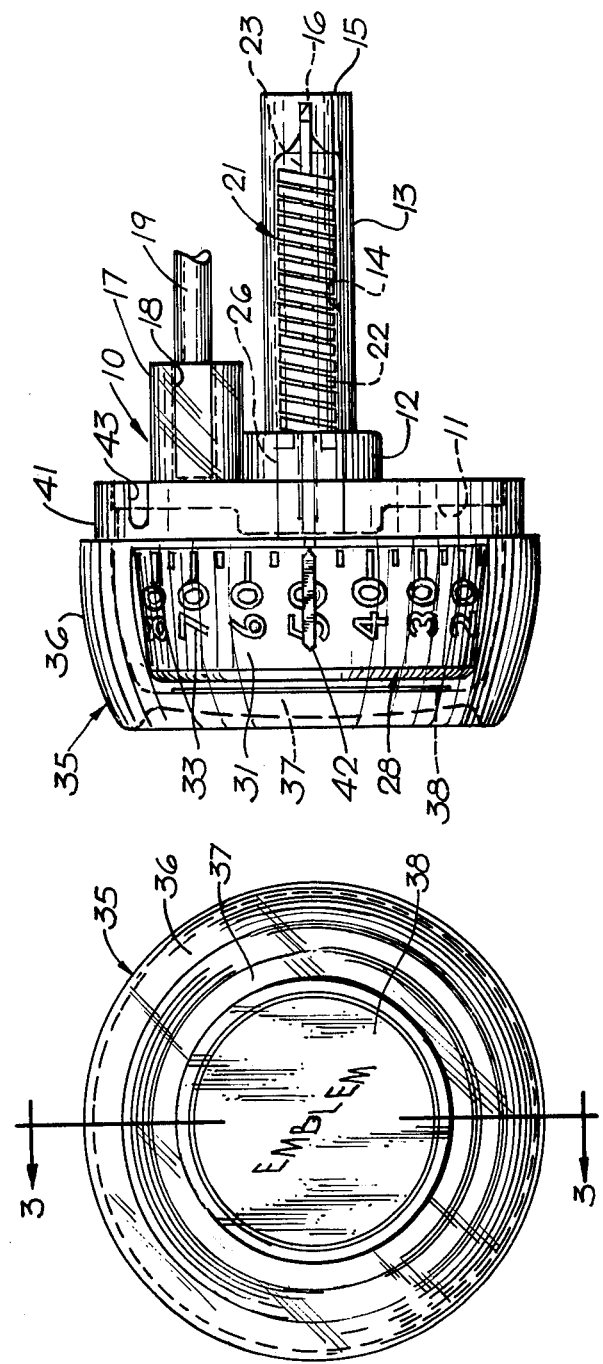
FIG. 1 is an end elevational view of the indicating thermometer.
FIG. 2 is a side elevational view of the indicating thermometer.

As illustrated in the drawings, the indicating thermometer includes a single piece main member generally designated at 10. The main member 10 comprises an annular disc-like portion 11 having an enlargement 12 at the center thereof and a stem-like portion 13 extending from the enlargement 12 axially of the disc-like portion 11. A cylindrical opening 14 extends through the enlargement 12 and partially through the stem-like portion 13 to provide the stem-like portion with a relatively thin tubular wall and an end wall 15. A hole 16 extending centrally from the opening 14 partially through the end wall 15 provides a bearing in the end wall of the stem-like portion. The disc-like portion 11 is eccentrically provided with an enlargement 17 having an opening 18 extending partially therethrough which is adapted to receive a fiber optic element 19 for illuminating the single piece main member 10 which is preferably made of a transparent crystal acrylic plastic material.

The indicating thermometer also includes a temperature responsive assembly generally designated at 21 which in turn comprises a bimetallic helical coil 22 which is secured at one end to a shaft 23 adjacent one end thereof as by welding indicated at 24. It also comprises a plug 26 having a central opening forming a bearing and having the other end of the bimetallic helical coil 22 secured thereto as by welding indicated at 25. The bimetallic helical coil 22 is preferably a left hand coil and has the high expansion side thereof on the inside so that as the bimetallic helical coil is heated due to temperature affecting the same, it operates to unwind. The temperature responsive assembly 21 is received as a unit in the opening 14 in the stem-like portion 13 of the main member with one end of the shaft 23 journalled in the hole 16 in the end wall 15 and with the shaft 23 journalled in the bearing the plug 26. The shaft 23 extends beyond the plug 23. The plug 26 is secured by ultra sonic bonding, epoxy resin or the like in the opening 14 in the enlargement 12. Preferably, the plug 26 and the shaft 23 are formed of stainless steel to facilitate the welding of the ends of the bimetallic helical coil 22 thereto. The bearings in the end wall 15 and in the plug 26 in addition to journaling the shaft 23 for rotation, also journal the shaft for sliding movement so as to accommodate any longitudinal movement of the shaft 23 due to temperature changes affecting the bimetallic helical coil 22.

The indicating thermometer also includes an indicator member generally designated at 28 having a disc-like portion 29 and a drum-like portion 31. The disc-like portion 29 has a central enlargement 30 provided with a central hole for mounting the same on the shaft 23 by a force fit. The indicator member 28 is preferably formed of white translucent acrylic plastic and the drum-like portion thereof is provided with temperature indicia 33. For a given temperature condition affecting the bimetallic element 22, the indicator member 28 is secured to the shaft 23 and held in fixed relation thereto by suitable epoxy resin 32 or the like. In this way, the indicating thermometer may be accurately calibrated during the production thereof. Preferably, the disc-like portion 29 of the indicator member is made opaque as by painting the same with the opaque aluminum or the like.

The indicating thermometer also includes a single piece annular cover member generally designated at 35 having an annular lens portion 36 and a disc portion 37. The cover member 35 is preferably formed of transparent crystal acrylic plastic. The inner face of the disc-like portion 37 of the cover member 36 may be provided with a decal 38 carrying an emblem or the like which is visible through the disc-like portion of the cover member.

The cover member 35 has an annular recess 40 which receives the disc-like portion 11 of the main member 10 and the two parts are secured together in the recess 40 by ultra sonic bonding, epoxy resin or the like. The annular lens portion 36 of the cover member 35 is provided with a marker 42 which cooperates with the indicia 33 on the indicator member 28 for indicating the temperature affecting the bimetallic helical coil 22. When the cover member 35 is secured to the main member 10, it is so angularly positioned with respect to the main member 10 that an accurate temperature is indicated by the indicia 33 and the marker 42.

Since light is admitted to the interior of the indicating thermometer by the fiber optic member 19, and since the drum-like portion 31 of the indicator member is translucent and the annular lens-like portion 36 of the cover member 35 is transparent, temperature indications by the indicating thermometer are readily discernible at night as well as during the day.

The cover member 35 of the indicating thermometer is preferably provided with an external annular recess 41 for the purpose of mounting the same, and this annular recess 41 is preferably provided with one or more locating slots 43 for locating the indicating thermometer in a bracket into which it is to be mounted. The present invention has particular utility for use in the automotive field wherein it is mounted in a bracket of a door mounted rear view mirror of an automotive vehicle which is diagrammatically illustrated in FIG. 4 and designated generally at 45. The bracket 45 is preferably hollow as indicated at 45 and receives the annular recess 41 of the cover member 35, the cover member and, hence, the indicating thermometer being secured in place in the bracket by ultra sonic bonding, epoxy resin or the like. The hollow interior 46 of the bracket 45 preferably includes one or more projections which are received in the slots 43 for appropriately angularly positioning the indicating thermometer in the bracket. The forward end of the bracket 45 has an opening 47 through which air may circulate around the stem portion 13 of the indicating thermometer and an opening 48 through which air may exit from the bracket. Thus, motion of the automotive vehicle continuously circulates air over the stem portion 13 of the indicating thermometer to provide for accurate outside or ambient temperature condition readings.

Preferably, as illustrated in FIG. 3A, the opening 14 in the stem portion 13 of the main member of the indicating thermometer is filled with a liquid indicated at 50. This liquid, which may be a silicone or the like, serves the function of transmitting rapidly changes in temperature conditions from the tubular wall of the stem portion 13 to the bimetallic helical coil 22 therein and of damping oscillations which may occur in the indicating thermometer due to vibration or the like.

While for purposes of illustration, one form of this invention has been disclosed, other forms thereof may become apparent to those skilled in the art upon reference to this disclosure and, therefore, this invention is to be limited only by the scope of the appended claims.

I claim:

1. An indicating thermometer comprising a single piece main member including an annular disc like portion having an enlargement at the center thereof, a stem like portion extending from the enlargement axially of the disc like portion, a cylindrical opening extending through the enlargement and partially through the stem like portion to provide the stem like portion with a relatively thin tubular wall and an end wall, and a hole extending centrally from the opening partially through the end wall to provide a bearing in the end wall of the stem like portion, a temperature responsive assembly including a shaft, a plug having a central hole therethrough slidably and rotatably receiving the shaft to provide a bearing therefor, and a bimetallic helical coil secured at one end to the shaft adjacent one end thereof and secured at its other end to the plug, said temperature responsive assembly being inserted in the opening in the single piece main member at the enlargement of the disc like portion thereof and located therein with the bimetallic helical coil adjacent the tubular wall of the stem like portion, with said one end of the shaft journalled for sliding and rotation in the bearing in the end wall of the stem like portion, with the plug secured in the opening in the enlargement of the disc like portion, with the shaft journalled for sliding and rotation in the bearing of the plug, and with the other end of the shaft extending beyond the plug, an indicator member secured to said other end of the shaft adjacent the annular disc like portion of the main member to be rotated by the shaft in accordance with temperature conditions affecting the bimetallic helical coil, and a single piece annular cover member secured to the annular disc like portion of the single piece main member for enclosing the indicator member.

2. An indicating thermometer as defined in claim 1 wherein the single piece main member is a molded synthetic plastic member.

3. An indicating thermometer as defined in claim 1 wherein the opening in the single piece main member between the end wall of the stem like portion thereof and the plug of the temperature responsive assembly contains a liquid.

4. An indicating thermometer as defined in claim 3 wherein the liquid more readily transfers temperature conditions from the tubular wall of the stem like portion of the main member to the bimetallic helical coil of the temperature responsive assembly.

5. An indicating thermometer as defined in claim 3 wherein the liquid damps oscillations of the bimetallic helical coil and the shaft positioned thereby.

6. An indicating thermometer as defined in claim 1 wherein the plug is adhesively secured in the opening in the enlargement of the disc like portion.

7. An indicating thermometer as defined in claim 1 wherein the indicator member is adhesively secured to the other end of the shaft.

8. An indicating thermometer as defined in claim 1 wherein the annular cover member is adhesively secured to the disc like portion of the main member.

9. An indicating thermometer as defined in claim 1 wherein the shaft and the plug of the temperature responsive assembly are metallic and the bimetallic helical coil thereof is secured thereto by welding.

10. An indicating thermometer as defined in claim 1 wherein the single piece main member is a transparent and light transmitting molded synthetic plastic member and wherein fiber optic means are provided for applying light to the annular disc like portion thereof for illuminating the indicator member adjacent thereto.

11. An indicating thermometer as defined in claim 1 wherein the single piece annular cover member is a transparent molded synthetic plastic cover through which the indicator member is visible.

12. An indicating thermometer as defined in claim 11 wherein the indicator member is an opaque molded synthetic plastic member having temperature indicia thereon.

13. An indicating thermometer as defined in claim 12 wherein the transparent cover member has a marker thereon cooperating with the indicia on the indicator member for indicating the temperature conditions affecting the bimetallic helical coil.

* * * * *